United States Patent
Hwang et al.

(10) Patent No.: US 7,864,289 B2
(45) Date of Patent: Jan. 4, 2011

(54) APPARATUS AND METHOD FOR ATTACHING SUBSTRATES

(75) Inventors: Jae Seok Hwang, Seongnam-si (KR); Kyung Mi Kim, Seongnam-si (KR)

(73) Assignee: ADP Engineering Co., Ltd. (KR)

( * ) Notice: Subject to any disclaimer, the term of this patent is extended or adjusted under 35 U.S.C. 154(b) by 483 days.

(21) Appl. No.: 11/866,877

(22) Filed: Oct. 3, 2007

(65) Prior Publication Data

US 2008/0135127 A1    Jun. 12, 2008

(30) Foreign Application Priority Data

Dec. 8, 2006    (KR)    ............ 10-2006-0125002

(51) Int. Cl.
*G02F 1/1339*    (2006.01)
*B23K 37/00*    (2006.01)

(52) U.S. Cl. .................. 349/190; 156/580; 349/187
(58) Field of Classification Search ............ 349/190, 349/187; 156/580
See application file for complete search history.

(56) References Cited

U.S. PATENT DOCUMENTS

2006/0005920 A1* 1/2006 Muramoto et al. .......... 156/285
2008/0053619 A1* 3/2008 Nakayama et al. .......... 156/382

* cited by examiner

*Primary Examiner*—David Nelms
*Assistant Examiner*—Nathanael R Briggs
(74) *Attorney, Agent, or Firm*—KED & Associates, LLP

(57) ABSTRACT

An apparatus for attaching substrates includes an upper chamber for holding an upper substrate and a lower chamber for holding a lower substrate which is to be attached to the upper substrate. The lower chamber is moved up and down so as to come together with the upper chamber to form a sealed attaching space. A substrate receiving part is fixed to a frame of the apparatus so that it does not move as the lower chamber is raised and lowered. The substrate receiving part alternatively projects from the lower chamber is the lower chamber is moved down, or is recessed into the top of the lower chamber when the lower chamber is lifted up.

20 Claims, 6 Drawing Sheets

APPARATUS AND METHOD FOR ATTACHING SUBSTRATES

BACKGROUND

This application claims the benefit, under 35 U.S.C. §119, of the filing date of Korean Patent Application No. 10-2006-0125002, filed on Dec. 8, 2006, the entire contents of which is incorporated herein by reference.

1. Field

The present disclosure relates to an apparatus and method for attaching substrates, and more particularly to a support and lifting mechanism capable of lifting a substrate independently from a chamber that normally holds the substrate.

2. Background

Recently, with development of an information society, requirements for display devices have been diversified. Therefore, various types of display devices have been developed such as a liquid crystal displays (LCDs), a plasma display panels (PDPs), etc. Users of these display devices require superior video quality, light weight as well as large scale. Therefore, there has been recently developed a super large scale LCD having a size of more than 50 inches.

A LCD is a display device which displays information on its screen using anisotropy of a refractive index of a liquid crystal. The LCD is manufactured by adding liquid crystals between two substrates and attaching the two substrates together. One of the two substrates is a driving device array substrate and the other is a color filter (CF) substrate. A plurality of pixels are formed on the driving device array substrate, and each pixel is formed with a driving device such as a thin film transistor (TFT). A color filter layer for realizing color is formed on the color filter substrate, along with pixel electrodes, a common electrode and an alignment film for aligning a liquid crystal molecule.

In a process for manufacturing a LCD display device, it is a very important to attach two substrates together in a precise manner. The apparatus for attaching the substrates has become larger as the display devices have become larger. The substrate attaching apparatus holds an upper substrate and a lower substrate in a chamber which is capable of maintaining a vacuum state. The substrates are held on an upper chamber and a lower chamber, respectively. The substrates are typically carried into an inside of the chamber by a transportation robot. The substrates are received and held by substrate receiving pins provided on the upper chamber and the lower chamber. The substrates are then seated on the upper chamber and the lower chamber.

A plurality of substrate receiving pins are provided for each of the upper and lower substrates, and the pins are uniformly spaced across the entire area of the substrate to stably hold the substrate when in a horizontal orientation. The substrate receiving pins on the upper and lower chambers are provided together with a driving apparatus so that they can be lifted up and down through holes which pass through the upper chamber and the lower chamber. In order to maintain the inside of the chamber in a vacuum state, a sealing member such as a bellows is provided around the through holes and the pins. The bellows maintain the vacuum, but allow the pins to move relative to the upper and lower chambers. The bellows are relatively expensive, and require periodic replacement to ensure that they can continue to keep a good seal around the pins.

As the substrates have increased in size, the number of substrate receiving pins required to hold the substrates has also increased. Consequently, the number of expensive sealing member bellows that are required, and a load of the driving apparatus for moving the pins has increased. In addition, as the number of pins has increased, it has become more difficult to simultaneously drive all of the plurality of the substrate receiving pins so that they maintain precisely the same height.

BRIEF DESCRIPTION OF THE DRAWINGS

The embodiments will be described in detail with reference to the following drawings in which like reference numerals refer to like elements wherein.

DETAILED DESCRIPTION

Figure 1:
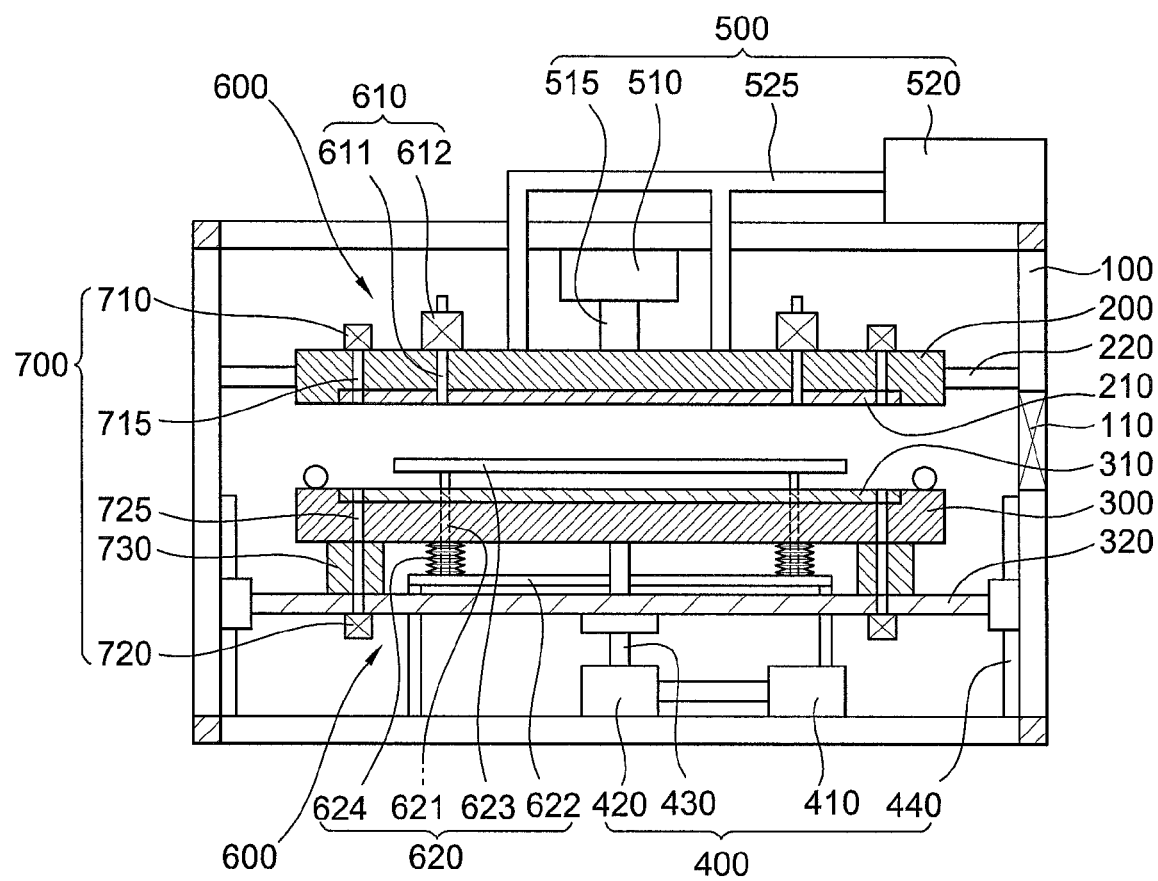
FIG. 1 is a sectional view illustrating a structure of an apparatus for attaching substrates.

FIG. 1 is a sectional view illustrating a structure of an apparatus for attaching substrates. Referring to FIG. 1, the apparatus includes an external frame 100 which forms an external appearance of the apparatus. An upper chamber 200 and a lower chamber 300 can be brought together to form a sealed substrate attaching space. A lifting part 400 provides an actuating force for raising and lowering the lower chamber. A vacuum part 500 forms a vacuum inside the sealed attaching space, and also provides a vacuum to the receiving pins. A substrate receiving part 600 receives the substrates. An alignment part 700 acts to align the substrates before they are attached to each other.

The external frame 100 is provided with a door 110 for inserting and removing the substrates. Preferably, the door 110 is opened only when the substrates are being inserted and removed so that foreign substances such as dust do not enter into an inside of the substrate attaching apparatus.

The insertion and removal of the substrates is performed by a transportation robot (not shown). The transportation robot is provided with one or more arms for transferring an upper substrate S1 and a lower substrate S2 into the attaching apparatus. The robot sequentially inserts the upper substrate S1 and the lower substrate S2 into the inside of the substrate attaching apparatus, and removes the substrates after they have been attached to each other.

The upper chamber 200 is fixed to the external frame 100 via a support 220 which is fixed to an inner wall of the external frame 100. The lower chamber 300 is capable of being raised and lowered by the lifting part 400. The lower chamber 300 is mounted on an upper part of a horizontal frame 320, which is connected with the lifting part 400. When the lower chamber 300 is lifted up and coupled with the upper chamber 200, the sealed attaching space, in which the upper substrate S1 and the lower substrate S2 can be attached, is formed.

The upper chamber 200 is provided with an upper chuck 210 for holding the upper substrate S1. The upper chuck 210 may be an electrostatic chuck (ESC) which holds the upper substrate S1 with an electrostatic force. The upper chuck 210 may be recessed into the upper chamber 200 to form an integral chamber structure.

The lower chamber 300 is provided with a lower chuck 310 for holding the lower substrate S2. The lower chuck 310 also may be an electrostatic chuck (USC) which holds the lower substrate S2 with an electrostatic force. Also, the lower chuck 310 may be recessed into the lower chamber 300 to form an integral chamber structure.

The lifting part 400 includes a lifting motor 410 for providing a force for raising and lowering the lower chamber 300. A reducer 420 transfers the force of the lifting motor 410 to a lifting screw 430, which supports, raises and lowers the horizontal frame 320. A guide 440 guides the raising and lowering of the horizontal frame 320.

Preferably, the lifting motor 410 is a motor which can generate a force capable of supporting the load of the lower chamber 300 and lifting and lowering the lower chamber 300. The lifting motor 410 could be an AC motor, a DC motor and the like. The reducer 420 converts the high speed rotational force from the lifting motor 410 into a low speed rotational force, which causes the lifting screw to rotate at a low speed so that it can lift up and lower the lower chamber at a suitable speed. The guide 440 can be provided at both ends of the horizontal frame 320 which supports the lower chamber 300. The guide 440 helps to maintain a balance of the lower chamber 300, which ensures smooth lifting and lowering operations.

The vacuum part 500 includes a first vacuum pump 510 for providing a vacuum force to an upper receiving part 610 which receives the upper substrate S1, as will be described later. A second vacuum pump 520 provides a vacuum in an inside of the attaching chamber formed between the upper and lower chambers. The first vacuum pump 510 is fixed to the external frame 100 and is connected to the upper receiving part 610 of the upper chamber 200 through a first vacuum pipe 515. The second vacuum pump 520 is also attached to the external frame 100 and is connected to the attaching space through a second vacuum pipe 525.

The vacuum pumps of the vacuum part 500 may be a dry pump, a turbomolecular pump (TMP), a mechanical boost pump, etc. Preferably, the vacuum pump is connected to a rotary vane pump which is capable of discharging vacuum-pumped substances.

The substrate receiving part 600 includes an upper receiving part 610 which receives the upper substrate S1 and a lower receiving part 620 which receives the lower substrate S2. The substrate receiving part 600 receives the upper substrate S1 and the lower substrate S2 from the transportation robot and helps to seat the substrates onto the upper chamber 200 and the lower chamber 300. In addition, after the substrates have been attached to each other, the substrate receiving part helps to separate the attached substrates from the lower chamber 300 so that the transportation robot can remove the attached substrates.

The upper receiving part 610 includes a plurality of substrate receiving pins 611 and a driving part 612. The substrate receiving pins 611 are provided to receive the upper substrate S1 from the transportation robot and to seat it onto the upper chamber 200. The substrate receiving pins 611 are lifted up and down by the driving part 612 such that they can project from a lower side of the upper chamber 200 and then be recessed into an inside of the upper chamber 200. The driving part 612 may be provided with a driving motor (not shown) for driving the substrate receiving pins 611 and a screw (not shown). Also, the substrate receiving pins 611 are connected with the first vacuum pump 510 for generating a vacuum force that is used to hold the upper substrate S1.

The lower receiving part 620 includes a fixed plate 622 which is fixed to the external frame so that it does not move regardless of the raising and lowering of the lower chamber 300. Vertical supports 621 are attached to an upper side of the fixed plate 622. A horizontal support 623 extends between the vertical supports 621.

When the lower chamber moves up and down, the vertical supports 621 pass through holes in the lower chamber 300 and project above the lower chamber 300. The vertical supports 621 may include a plurality of pins having a predetermined thickness.

The horizontal support 623 is coupled to the ends of the vertical supports 621. The horizontal support 623 may be formed into a bar shape which is connected with a plurality of the vertical supports 621. Preferably, the horizontal support 623 is formed parallel to the longitudinal direction of the robot arm of the transportation robot so as not to have an influence on a movement of the robot arm. It is preferable to provide a groove on an upper side of the lower chamber 300 so that the horizontal support 623 can be recessed into the groove on the lower chamber 300 when the lower chamber is lifted up.

The bellows 624 surround the vertical supports 621. A first end of each of the bellows 624 is connected with a lower side of the lower chamber 300. The other ends of the bellows 624 are connected to the fixed plate 622. The bellows 624 are sealing members having flexibility and sealability. A formed bellows, a welded bellows and the like made of a metallic material may be used. Therefore, the bellows 624 can seal a space around the through holes for the vertical supports 621, regardless of the movement of the lower chamber 300.

The alignment part 700 is for aligning the upper substrate S1 and the lower substrate S2 so that the substrates are precisely attached to one another. One or more cameras 710 may installed at an upper end of the upper chamber 200. Illuminating devices 720 are installed at a lower end of the lower chamber 300. A position adjusting device 730 is used for adjusting a position of the lower chamber.

The cameras 710 detect alignment marks on the upper substrate S1 and the lower substrate S2 through photographing holes 715 which passes through the upper chamber 200. This allows the alignment part 700 to determine whether the substrates are properly aligned. The illuminating devices 720 provide light through illuminating holes 725 which pass through the lower chamber 300 so that the cameras 710 can detect the alignment marks.

The position adjusting device 730 can include a plurality of actuators that are in contact with the lower side of the lower chamber 300. A lower side of the position adjusting device 730 is fixed to the stage 320 which supports the lower chamber 300. Generally, multiple position adjusting devices 730 are provided at multiple positions on the lower chamber 300 so that lower chamber 300 can be moved in X, Y and rotational directions.

Although not shown in the drawings, the substrate attaching apparatus may further include a pressurizing means for pressing the substrates together. A mechanical device for directly pressing on the substrates and/or a pressurization device using a gas pressure may be used. If gas pressure is used for the pressurization, the pressurizing means may include a gas tank and a gas supplying pipe for supplying an inert gas such as nitrogen gas, and a gas pressurizing hole for discharging the gas into the attaching space.

Figure 2:
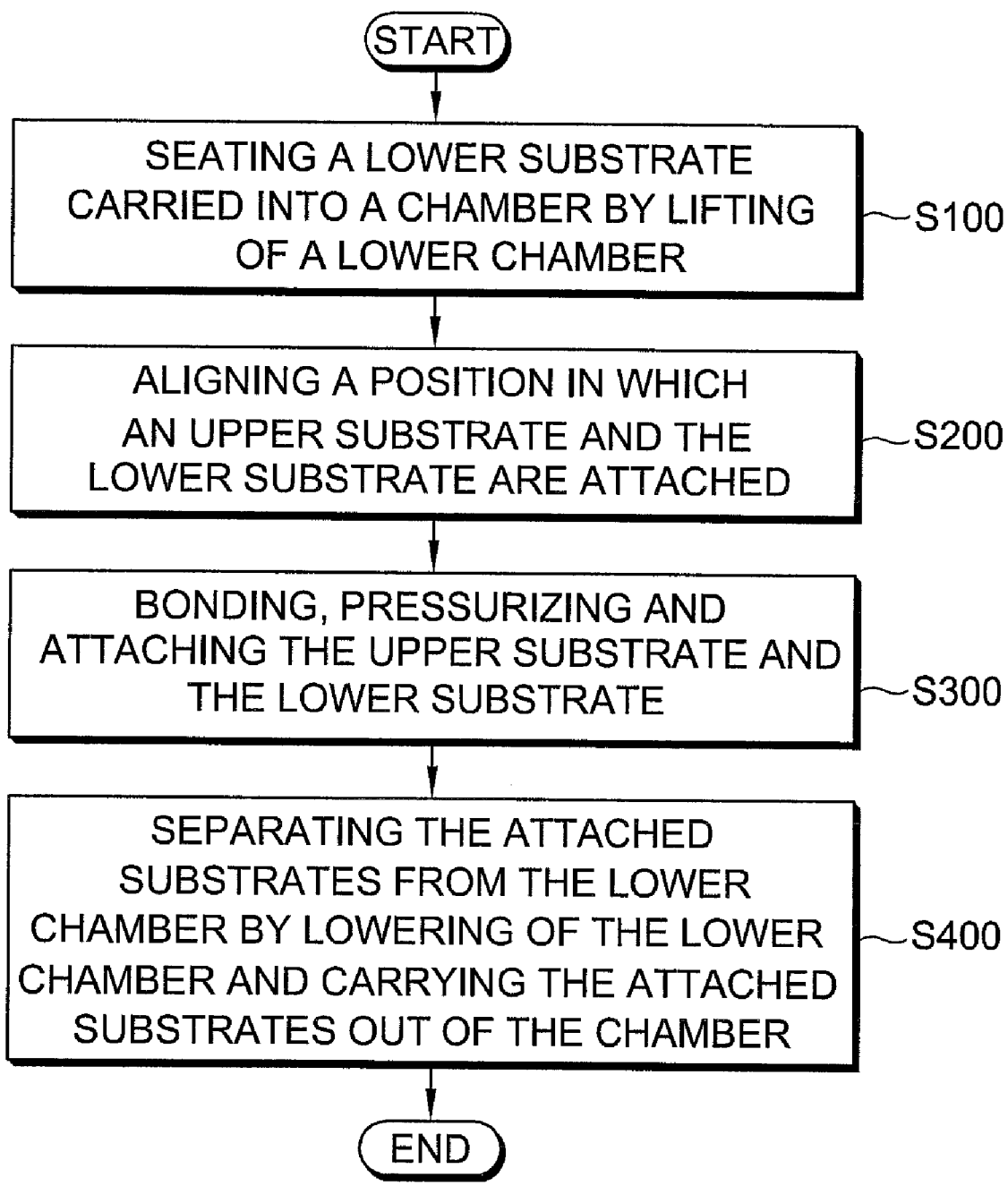
FIG. 2 is a flow chart showing a method for attaching substrates.
Figure 3:
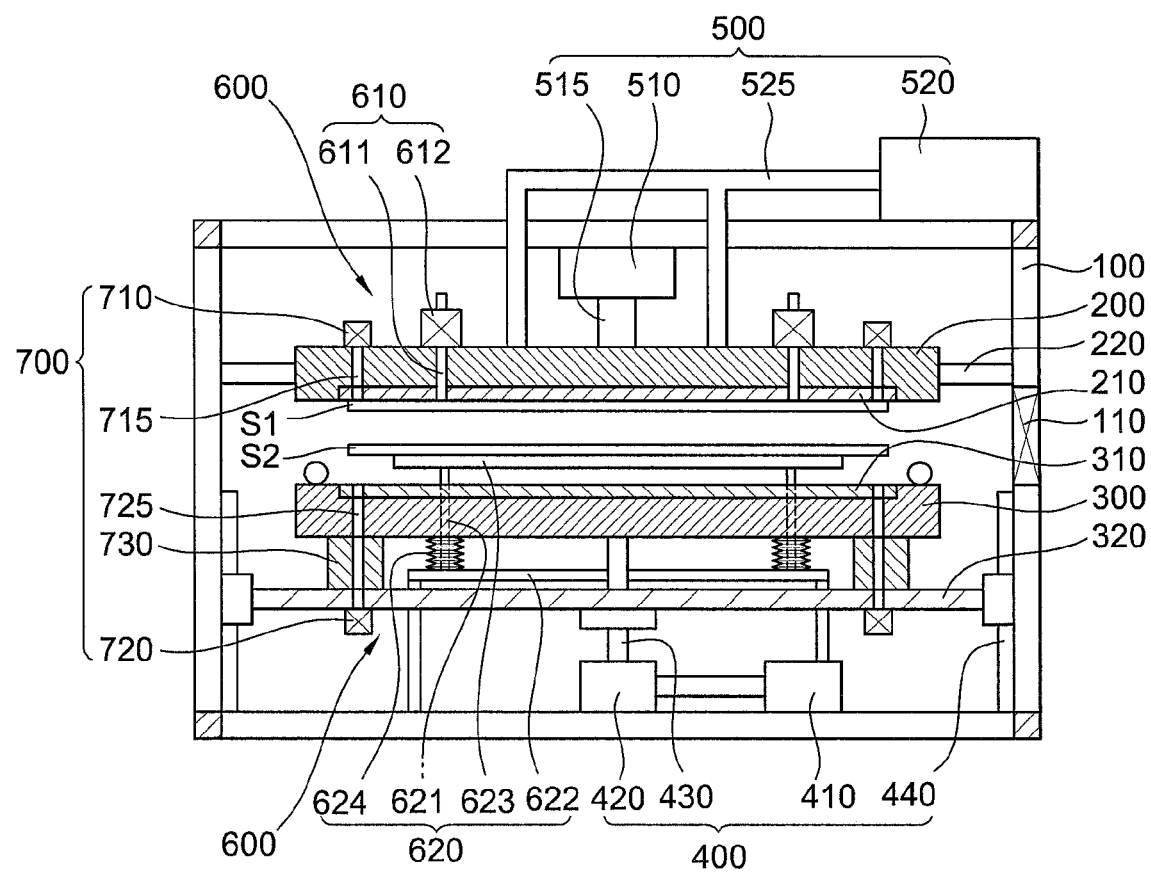
FIGS. 3-6 illustrate steps of a method for attaching substrates using an apparatus as shown in FIG. 1.
Figure 4:
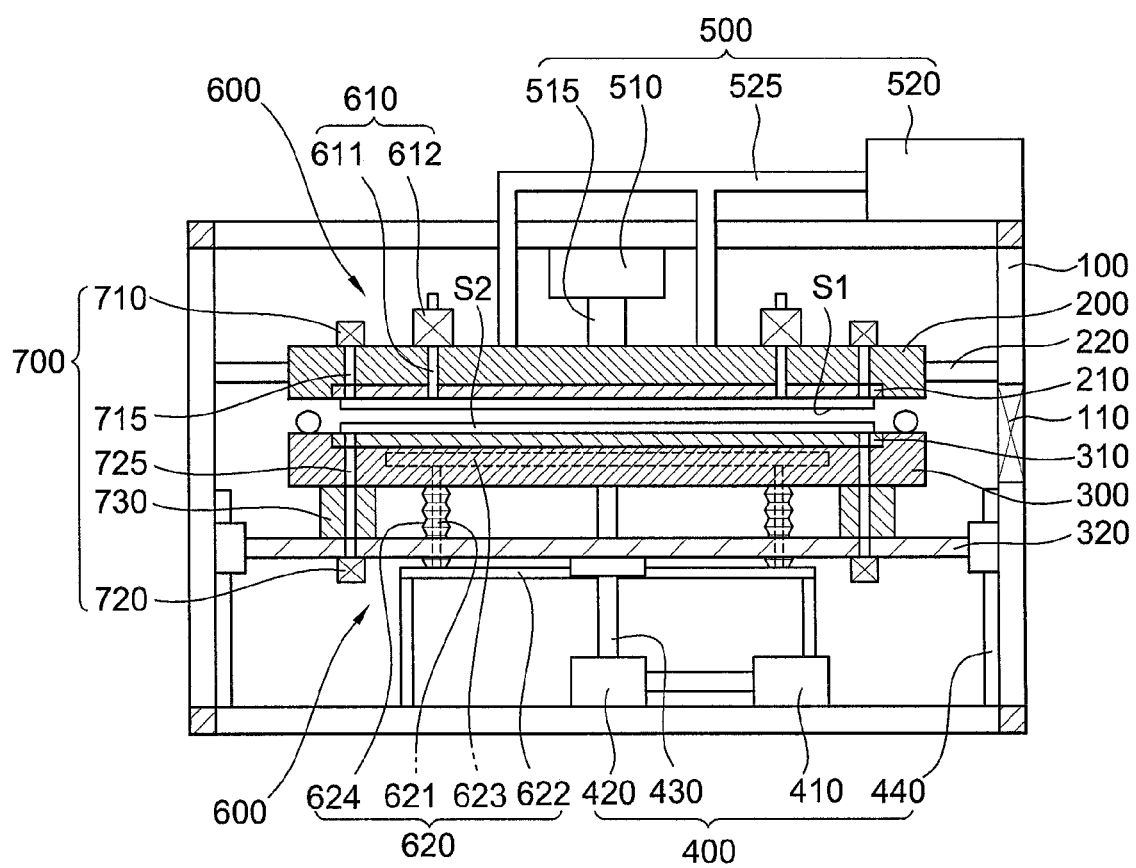
Figure 5:
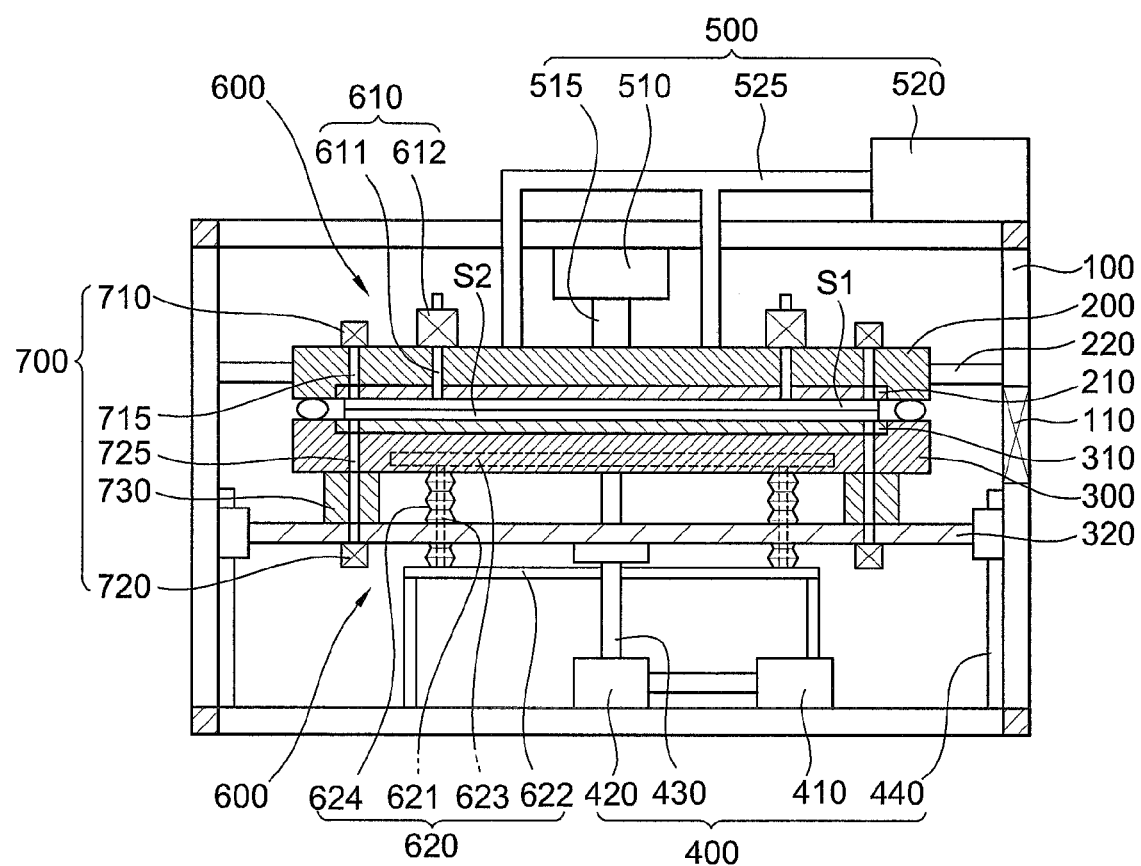
Figure 6:
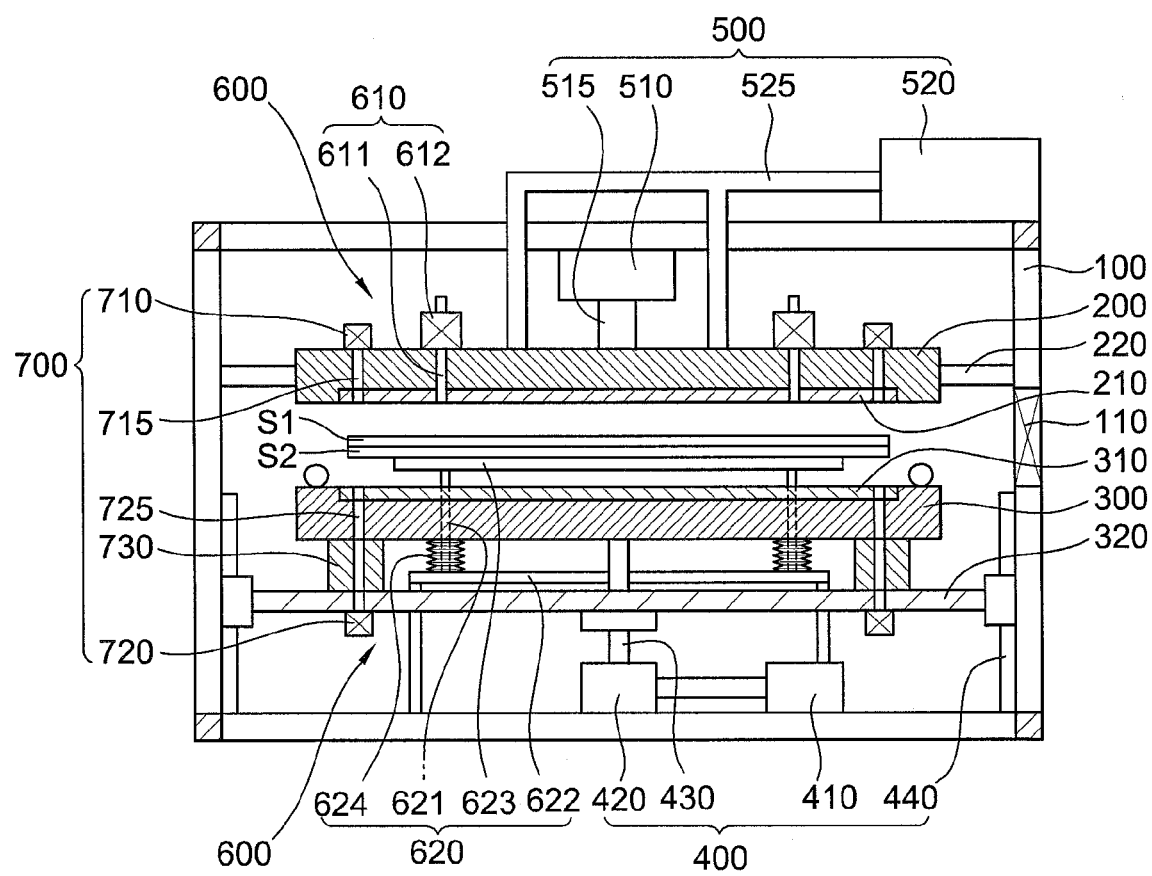

Hereinafter, an operation of the substrate attaching apparatus as described above, and a process of attaching the substrates, will be described with reference to FIGS. 2 to 6. FIG. 2 is a flow chart showing a method for attaching substrates. FIGS. 3-6 illustrate steps of an operation for attaching substrates. FIG. 3 illustrates a state where the upper substrate S1 and the lower substrate S2 have been carried into the substrate attaching apparatus. FIG. 4 illustrates a state where the lower chamber is lifted to seat the lower substrate S2 on the lower chamber 300. FIG. 5 illustrates a state where the upper chamber 200 and the lower chamber 300 are coupled to form the sealed attaching space, and where the substrates have been attached to each other. FIG. 6 illustrates a state where the lower chamber 300 is moved down and the attached substrates are seated on the lower receiving part 620.

Referring to FIGS. 2 to 6, in order to insert the substrates into the attaching apparatus, the lower chamber 300 lowered so that it is spaced apart from the upper chamber 200 at the maximum distance, and the door 110 of the external frame 100 is opened. Through the opened door 110, the transportation robot carries the upper substrate S1 into the inside of the attaching apparatus. After the upper substrate S1 is carried in, the substrate receiving pins 611 of the upper chamber 200 are extended down to vacuum-absorb the upper substrate S1. Then, the substrate receiving pins 611 which hold the upper substrate S1 are lifted up to seat the upper substrate S1 onto the upper chamber 200. At this time, the upper chuck 210 of the upper chamber 200 holds the upper substrate S1 with an electrostatic and/or vacuum force.

Once the upper substrate S1 is held by the upper chamber 200, the transportation robot carries the lower substrate S2 into the inside of the attaching apparatus. When the lower substrate S2 carried into the attaching apparatus to a suitable position, the robot arm of the transportation robot is lowered so that the lower substrate S2 is seated onto the lower receiving part 620 which projects above the lower chamber 300. After the lower substrate S2 is seated onto the horizontal support 623, the robot arm goes out of the attaching apparatus and the door 110 of the external frame 100 is closed.

Subsequently, the lower chamber 300 is lifted up to a predetermined height to seat the lower substrate S2 onto the lower chamber 300. At this time, the lower chuck 310 of the lower chamber 300 holds the lower substrate S2 with the electrostatic force. Since the lower receiving part 620 is fixed to the external frame 100, the lower receiving part 620 is recessed into top surface of the lower chamber 300 as the lower chamber 300 is lifted up.

When the lower substrate S2 is seated on the lower chamber 300, the lower chamber 300 is lifted further and coupled with the upper chamber 200 to form the sealed attaching space. At this time, the upper substrate S1 and the lower substrate S2 are adjacent to each other. Subsequently, the second vacuum pump 520 discharges air in the attaching space to maintain the attaching space in a vacuum state.

The alignment part 700 aligns the upper substrate S1 and the lower substrate S2 so that they can be precisely attached to one another. The cameras 710 detect the alignment marks of the upper substrate S1 and the lower substrate S2 to confirm that they are properly aligned. If the alignment state is poor, the position adjustment device 730 moves the lower chamber 300 to properly align the upper substrate S1 and the lower substrate S2.

When the alignment state is good, the electrostatic force of the upper chuck 210 which holds the upper substrate S1 is removed and thus the upper substrate S1 falls down onto the lower substrate S2. At this time, the upper substrate S1 and the lower substrate S2 are preliminarily attached by a sealant. Subsequently, the substrates are pushed together by the pressurizing means, and thus the upper substrate S1 and the lower substrate S2 are firmly attached to each other. If a gas pressurization device is used, gas is introduced into the attaching space and the upper substrate S1 and the lower substrate S2 are pushed together by a pressure difference between the gas that is introduced, and a vacuum state which will exist in a space between the two substrates.

Subsequently, the lower chamber 300 is moved down and the lower receiving part 620, which is fixed with respect to the lower chamber 300, projects up from the top surface of the lower chamber 300 to separate the attached substrates from the lower chamber 300. At this time, an electrostatic force should be removed from the lower chuck 310 of the lower chamber 300. After that, the door 110 of the external frame 100 is opened and the robot arm of the transportation robot enters into the inside of the chamber, and grasps the attached substrates and carries them out of the chamber (S400).

As described above, because the substrate receiving part can project above and be recessed into the top surface of the lower chamber as it is lifted and lowered, it is not necessary to use a plurality of substrate receiving pins to seat the lower substrate on the lower chamber. Likewise, the pins are not required to raise the attached substrates off the top surface of the lower chamber. In addition to eliminating the need for the pins and for running a vacuum source to the pins, this also eliminates the difficulty of adjusting heights of the plurality of substrate receiving pins. All of which reduces a cost for manufacturing the substrate attaching apparatus.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, various variations and modifications are possible in the component parts and/or arrangements which would fall within the scope of the disclosure, the drawings and the appended claims. In addition to variations and modifications in the component parts and/or arrangements, alternative uses will also be apparent to those skilled in the art.

What is claimed is:

1. An apparatus for attaching substrates, comprising:
a main frame;
an upper chamber mounted on an upper portion of the main frame, wherein the upper chamber is configured to receive and hold an upper substrate;
a lower chamber that is movably mounted on the main frame, wherein the lower chamber is configured to receive and hold a lower substrate, and wherein the lower chamber can be brought together with the upper chamber to seal the upper and lower substrates; and
a lower substrate receiving stage that is fixed on the main frame, wherein the lower substrate receiving stage includes a substrate support portion and a plurality of support legs, and wherein the lower substrate receiving stage remains stationary while the lower chamber is raised and lowered, wherein
when the lower chamber is lowered, the lower substrate receiving stage lifts the lower substrate, and when the lower chamber is raised, the lower substrate receiving stage is recessed into the lower chamber such that the lower chamber receives and holds the lower substrate.

2. The apparatus of claim 1, wherein the plurality of support legs are attached to the main frame, and wherein the plurality of support legs pass through corresponding holes in the lower chamber.

3. The apparatus of claim 2, further comprising a plurality of bellows, wherein each bellow is installed around one of the support legs, and wherein each bellow is sealed to a lower surface of the lower chamber.

4. The apparatus of claim 3, wherein bellows seal the holes in the lower chamber such that a vacuum can be maintained in the sealed attaching space.

5. The apparatus of claim 3, wherein a recess is formed in a top surface of the lower chamber, and wherein when the lower chamber is raised, the substrate support portion of the lower substrate receiving stage is received in the recess.

6. The apparatus of claim 5, wherein the substrate support portion comprises at least two elongated support rails, and wherein the recess formed in the top surface of the lower chamber comprises at least two channels that receive the support rails.

7. The apparatus of claim 1, wherein a recess is formed in a top surface of the lower chamber, and wherein when the lower chamber is raised, the substrate support portion of the lower substrate receiving stage is received in the recess.

8. The apparatus of claim 7, wherein the substrate support portion comprises at least two elongated support rails, and wherein the recess formed in the top surface of the lower chamber comprises at least two channels that receive the support rails.

9. The apparatus of claim 7, further comprising a chuck located on the top surface of the lower chamber, wherein the chuck is configured to generate a holding force to hold the lower substrate on the lower chamber.

10. The apparatus of claim 9, wherein when the lower chamber is raised so that it comes together with the upper chamber, the lower chamber lifts the lower substrate off of the substrate support portion.

11. An apparatus for attaching a first and second substrates, comprising:
   a main frame having a door between a first inner surface and a second inner surface of the main frame, wherein the first and second inner surfaces face each other;
   a first chamber provided inside the main frame, the first chamber having a first surface facing the first inner surface and movable from a first position to a second position, wherein a first distance between the first surface of the first chamber and the second inner surface of the main frame at the first position of the first chamber is less than a second distance between the first surface of the first chamber and the second inner surface of the main frame at the second position of the first chamber;
   a substrate receiving stage provided with the first chamber and configured to remain stationary when the first chamber is moved from the first position to the second position, the substrate receiving stage having a first surface facing the first inner surface and configured to receive a first substrate when the first chamber is at the first position, wherein a distance between the first surface of the substrate receiving stage and the second inner surface of the main frame remains the same when the first chamber is moved from the first position to the second position and the first substrate is provided on the first surface of the first chamber at the second position; and
   a second chamber provided inside the main frame, the second chamber having a first surface facing the second inner surface and configured to receive a second substrate, wherein the first chamber is moved relative to the second chamber such that the first and second substrates contact each other.

12. The apparatus of claim 11, wherein the main frame further includes a horizontal frame provided between the first and second inner surfaces of the main frame, the first chamber positioned on the horizontal frame, and wherein the horizontal frame moves the first chamber from the first position to the second position.

13. The apparatus of claim 11, wherein the main frame further includes a fixed plate provided between the first and second inner surfaces of the main frame, and the substrate receiving stage is mounted to remain stationary to the fixed plate.

14. The apparatus of claim 13, wherein the substrate receiving stage further includes a plurality of support legs, each having a fixed length.

15. The apparatus of claim 14, wherein the plurality of legs pass through corresponding holes in the first chamber.

16. The apparatus of claim 15, wherein the substrate receiving stage includes a plurality of bellows, wherein each bellow is installed around each of the plurality of support legs, and wherein the plurality of bellows seal each of the corresponding holes in the first chamber such that a vacuum is maintained between the first and second chambers when the first chamber is at the second position.

17. The apparatus of claim 11, wherein the first surface of the first chamber includes a recess provided thereto, the first surface of the substrate receiving stage is above the first surface of the first chamber at the first position, and the first surface of the substrate receiving stage is below the first surface of the first chamber at the second position.

18. The apparatus of claim 11, wherein the first chamber is configured to receive the first substrate from the substrate receiving stage when the first chamber is moved from the first position to the second position.

19. The apparatus of claim 11, wherein the substrate receiving stage is configured to receive the first substrate and the second substrate from the first chamber when the first chamber is moved from the second position to the first position.

20. The apparatus of claim 11, wherein the first chamber is a lower chamber positioned below the second chamber.

* * * * *